Patented Oct. 23, 1951

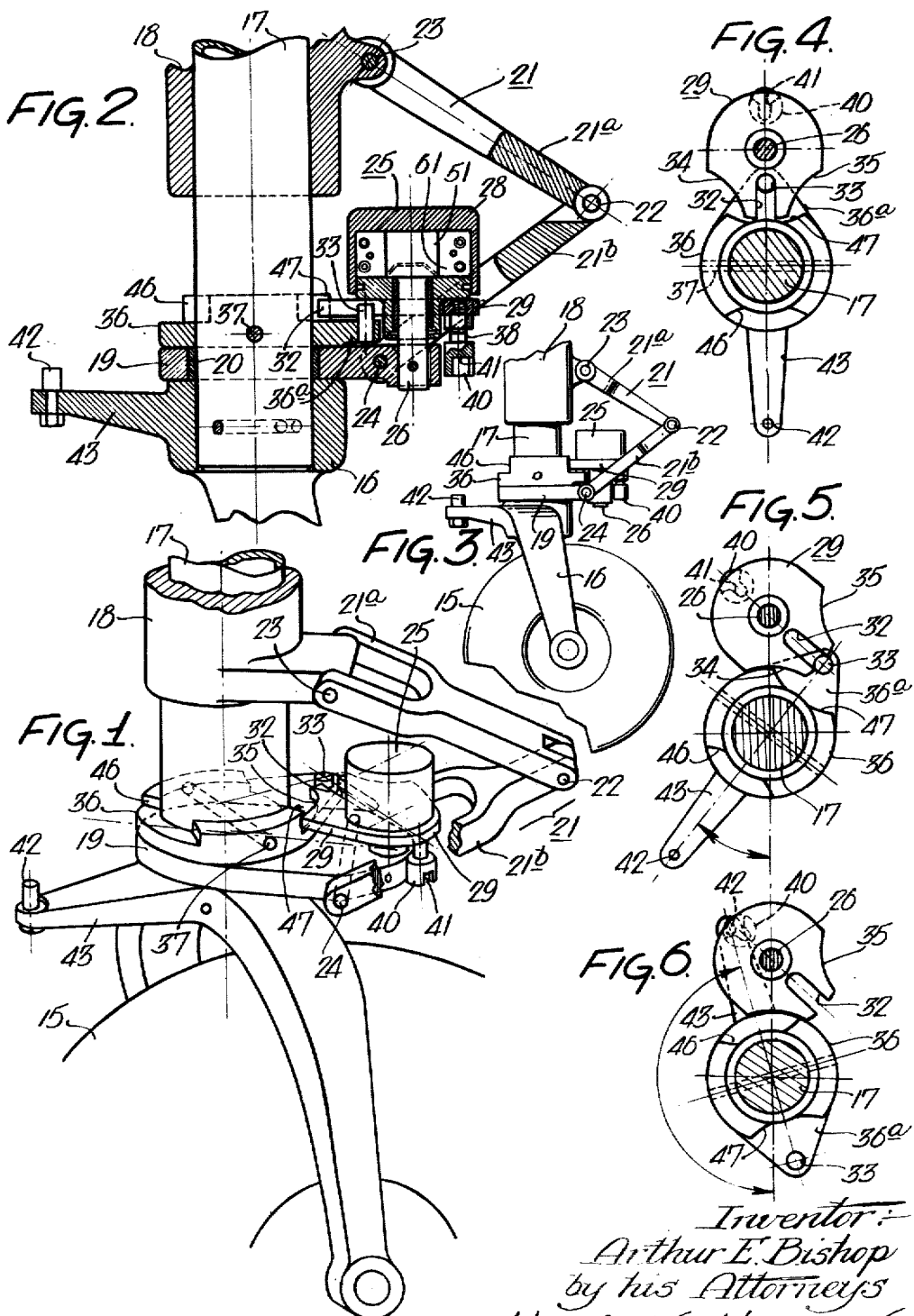

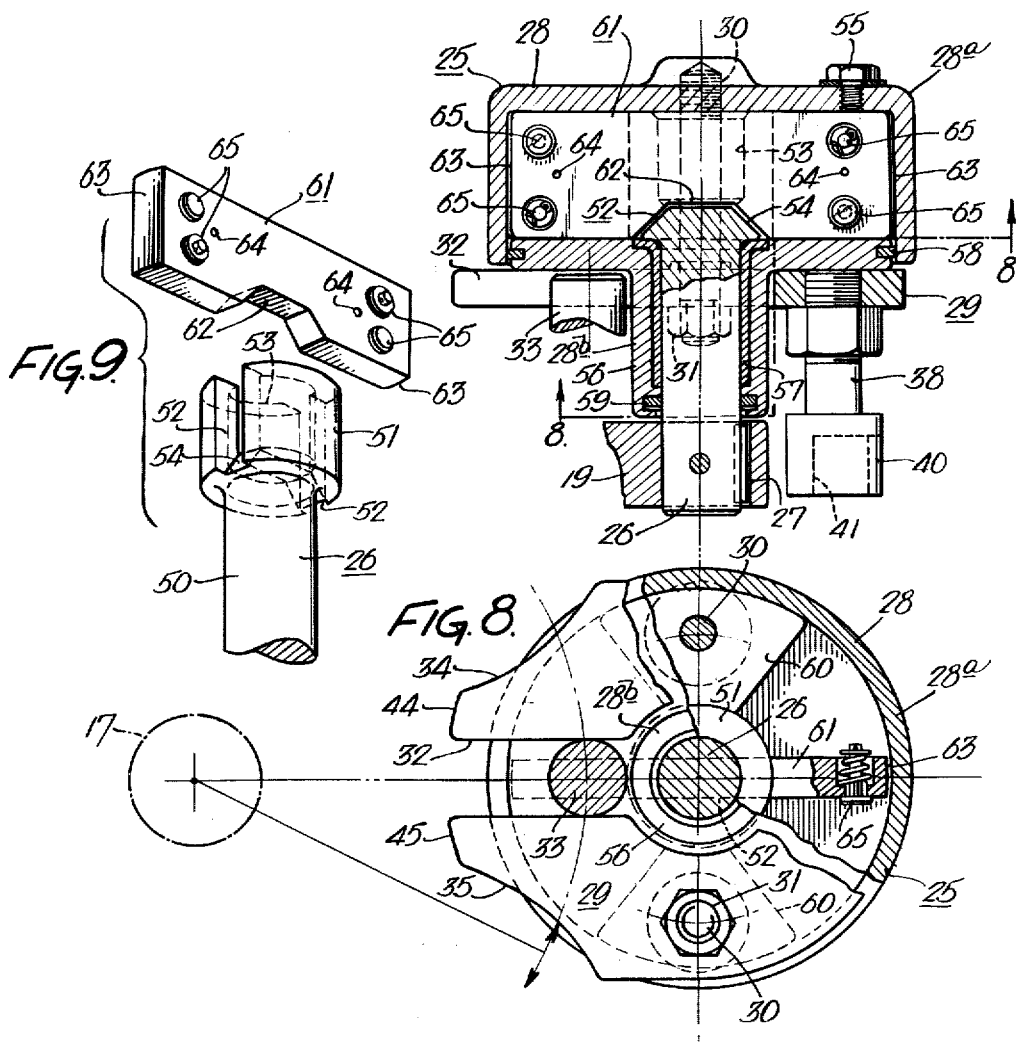

2,572,589

UNITED STATES PATENT OFFICE 2,572,589

OSCILLATION DAMPER FOR FULL SWIVELING WHEELS

Arthur E. Bishop, Chatswood, near Sydney, New South Wales, Australia

Application June 22, 1948, Serial No. 34,434

11 Claims. (Cl. 16—35)

This invention relates to means for controlling the rotation of a caster or swiveling wheel about its swiveling axis, and includes the provision of a rotary damping vane of improved design. Swiveling wheels of the type shown in the present invention are intended for use primarily on the landing gear of aircraft, especially the nose or tail wheels. The requirements of such an installation are that the spindle of the wheel forms a portion of an axially compressible shock strut device intended to dissipate shock incident to the landing of the aircraft.

A further requirement of such an installation is that a maximum damping action be afforded when the wheels are in the in-line position for straight movement of the aircraft and that when the wheel is swiveled, substantially away from the in-line position, the damper becomes disengaged to afford a minimum damping action so that the aircraft may be taxied or handled on the ground conveniently. The structure must be light in weight, extremely rugged, shockproof and require a minimum of servicing.

Furthermore, it must be designed to be applied to retractable landing wheels either with or without the conventional shock strut.

In my U. S. Patent No. 2,367,993 I have described a damping construction for aircraft landing wheels which provides the maximum damping effect in the forward in-line position so that shimmy or wobble is reduced to a minimum. Ordinarily, an aircraft landing gear does not describe a complete revolution but returns to the normal in-line position through the same angle of deviation therefrom.

The present invention provides a construction which is not limited by the above requirement since the damping mechanism will be operative whether the wheel makes a complete revolution or reverses its direction of rotation to return to the normal in-line position.

The ability to execute a full 360° turn with the caster wheels is of especial significance in the parking and maneuvering of lighter types of aircraft in confined spaces.

When it is desired to use hydraulic damping means, the construction herein illustrated and described provides novel and useful improvements which facilitate manufacture and result in a more serviceable and long-wearing device. Certain further advantages are claimed for the construction by virtue of the proper location of bearings and load carrying elements. This feature is important when the device is used in conjunction with a telescoping shock strut which employs hinged links for the transmission of torque past the sliding elements of such struts.

A primary object, therefore, of the invention is to provide a pin and slot motion in an oscillation damper, of the type described, which permits proper engagement of the damper when the swiveling member makes a complete revolution.

A further object of the invention is to provide in a hydraulic vane-type damper a floating vane construction which is especially adapted to the high stresses found in aircraft landing gears.

Further objects will be apparent from the specification and drawings in which:

Fig. 1 is a perspective showing an oscillation damper constructed in accordance with the invention, installed on one of the landing wheels of an airplane and with the wheel turned at approximately 45° from the in-line position;

Fig. 2 is a fragmentary sectional detail taken on a longitudinal axis of Fig. 1;

Fig. 3 is a side elevation on a reduced scale of the structure of Fig. 1;

Figs. 4–6 are details in reduced scale showing the pin and slot mechanism for actuating the dashpot or damping means;

Fig. 7 is an enlarged sectional elevation through the dashpot;

Fig. 8 is a bottom view of the structure of Fig. 3 as seen at 8—8;

Fig. 9 is a detached perspective showing the construction of the dashpot spindle and vane.

The invention comprises essentially the provision of a vane type dashpot mounted on a plate directly above the fork of the landing wheel. The plate is non-rotatably locked with respect to the landing gear but at the same time is permitted to move axially by means of the conventional hinge or scissors linkage. A rotatable collar or plate, having a short arm, is mounted on the wheel spindle directly above the non-rotatable plate. A pin on the rotatable plate is adapted to engage a slotted member fastened securely to the dashpot housing. The wheel spindle is provided with a long arm and pin adapted to reverse the slotted plate on the dashpot housing so that if the wheel is turned through a complete circle, the plate slot is always positioned to receive the pin on the short arm.

Referring now more particularly to the drawings, wheel 15, which may be of any swiveling type but especially the nose or tail wheel of an aircraft, is mounted in fork 16 in the standard manner. A stem or spindle 17 extends upwardly from the center of the fork 18 and is axially slidable in housing 18. Resilient means for controlling the sliding of the spindle 17 in housing 18 to provide suitable shock absorption on landing the aircraft may be installed in accordance with conventional practice. A plate 19 is rotatably supported at the base of spindle 17 and directly over fork 16 by means of bushing 20 and is maintained in radial alignment with housing 18 by means of the scissors linkage 21 consisting of upper bifurcated arm 21a and lower bifurcated arm 21b, the arms being pivoted to each other at 22, and to housing 18 at 23, and to plate 19 at 24. It will thus be apparent that plate 19 has axial movement with respect to housing 18 but has no rotation relative to the housing. Plate 19 is elongated and carries a hydraulic vane type dashpot 25, the spindle 26 of the dashpot being non-rotatably secured to plate 19 by means of key 27 (Fig. 7). The dashpot housing 28 is rotatable on spindle 26 and carries a plate or member 29 secured to the housing 28 by means of studs 30, 30 and nuts 31, 31. In this way, the dashpot housing 28 and the plate 29 pivot as a unit with respect to plate 19. Plate 29 has a radially extending slot 32 adapted to receive pin 33 and is also provided with arcuate retaining surfaces 34 and 35 adjacent slot 32.

The main or primary actuating means for the dashpot comprises a collar 36 pinned to spindle 17 at 37 and having a relatively short arm 36a which carries pin 33. The radius of surfaces 34 and 35 is substantially the same as the radius of the periphery of collar 36 and these surfaces are adapted to engage the periphery of the collar when the pin 33 has turned the dashpot housing and plate 29 to the position shown in Fig. 5.

So that the plate or member may always be positioned to receive pin 33, I provide secondary actuating means for the plate member. A downwardly extending stud 38 set radially 180° from slot 32, is secured to the plate by means of lock nut 39. Stud 38 has an enlarged head 40 which is radially milled to provide a Y-shaped recess 41 (Figs. 4-6) adapted to receive pin 42 on long arm 43. Arm 43 is integrally formed with fork 16 and extends radially from the center line of spindle 17 a distance sufficient to engage the recess 41 on stud 38 when the fork is rotated on its spindle. The arcuate recesses 34 and 35 terminate in curved tips 44 and 45 which are received in arcuate milled grooves 46 and 47 on the upper portion plate 36. This construction enables the tips 44 and 45 to rotate past plate 36 when pin 33 is engaged in slot 32.

Referring now to Figs. 7 to 9, the dashpot 25 is of the stationary vane type and comprises a stationary spindle 26 non-rotatably mounted on plate 19, the spindle being provided with a shank portion 50 and an enlarged head 51 having a milled slot 52 and an axial recess 53. The ends of slot 52 extend axially the entire length of head 51 whereas the shank 50 is carried slightly upward between the sides to provide a reinforcing web 54 for the sides of the slot. The dashpot housing 28 comprises an upper cup-shaped member 28a adapted to receive hydraulic fluid through filler plug 55, and a lower housing 28b which has an elongated sleeve 56 rotatably mounted on shank 50 of spindle 26 by means of bushing 57. Suitable annular seals 58 and 59 prevent leakage of the hydraulic fluid from the case. Upper housing 28a and lower housing 28b are secured to each other by means of studs 30 and nuts 31 which pass through drilled sectors 60, 60 that also function as the movable elements of the dashpot.

The stator or stationary vane 61 floats in slot 52 and has a notch 62 adapted to fit over the reinforcing member 54. Vane 61 is provided with rounded ends 63, 63 and suitable orifices 64, 64 designed to produce the proper hydraulic damping action between stator 61 and movable elements 60, 60. If desired, spring loaded relief valves 65 may be incorporated in each end of vane 61, and the valves in each end are reversed to provide for opposite actuation. The length of sleeve 56 and bushing 57 is ample to accommodate any stress imposed upon the dashpot and is so located with respect to plate 29 and pin 33 that the overhung bearing effect or twisting moment is reduced to a minimum. The dashpot construction is simple and inexpensive to manufacture, specifically the floating vane avoids a difficult machining operation necessary with integral type vanes since it is not essential that the spindle and the housing be concentric in order to provide proper clearance between the ends of the vane and the housing.

Referring now to Figs. 4-6, it will be apparent that the dashpot together with the plate and pin motion provides maximum damping action over an arc of approximately 70° when the wheel 15 is in the normal forward position of Fig. 4. In the reverse position of Fig. 6, the damping action is limited to approximately 20° of the wheel rotation. When the fork 16 rotates past the 180° position to complete an entire revolution, the slot 32 must be re-aligned to engage pin 33 from the opposite direction. Fig. 4 shows the normal in-line forward position in which pin 33 is engaged at the base of slot 32, in this position maximum damping in either direction is obtained and it will be noted that the ratio of lever arms is approximately 4:1. Fig. 5 shows the pin 33 about to leave slot 32, the fork and spindle having been rotated through an arc of approximately 35°. At this point the circular periphery of plate 36 becomes engaged with surface 34 to lock plate 29 and dashpot 25 against further rotation. Continued swiveling of fork 16 is shown in Fig. 6 in which approximately 160° of rotation has taken place from the position of Fig. 4, at this point pin 42 engages stud 40 to reverse plate 29 and dashpot 25, tips 44 and 45 turning through arcuate face 46, thus it will be seen that the slot 32 is ready to receive pin 33 from the opposite direction, whereupon the wheel resumes its initial forward position.

A further important feature of the present construction resides in the location of the dashpot 25. Referring to Fig. 2, it will be seen that a line drawn from the center of pin 22 to the center of plate 19 passes through the point of intersection of pin 33 and slot 32. In this position, the scissors linkage and the dashpot are in stable equilibrium for loads applied at the above points; therefore, there is no resultant turning moment in bushing 20. While this advantageous condition holds true for relatively small ranges of shock strut compression, the known weight loading and balance of the plane enables the normal position of the shock strut piston or spindle to be determined within close limits so that definite saving in weight is achieved through the proper design of these parts.

I claim:

1. Apparatus for damping oscillations of a first swiveling wheel structure rotatably mounted in a second relatively fixed bearing structure comprising a radially slotted member pivotally mounted on one of said structures, primary actuating means carried by the other of said structures for pivoting said member by engagement with the slot therein, means for retarding free pivotal movement of said member throughout a predetermined angle of operative range of said member defined by limit positions equally spaced on opposite sides of a center in-line position, and secondary actuating means rigidly connected to said primary actuating means for engaging and shifting the member between the limit positions in accordance with the direction of relative angular rotation between said first swiveling wheel structure and said second relatively fixed bearing structure.

2. Apparatus for damping oscillations of a first swiveling wheel structure rotatably mounted in a second relatively fixed bearing structure comprising a radially slotted member pivotally mounted on said bearing structure, primary actuating means carried by said wheel structure for pivoting said member with respect to the bearing structure when said primary means engages the slot, means for retarding free pivotal movement of said member throughout a predetermined angle of operative range of said member defined by limit positions equally spaced on opposite sides of a center in-line position, and secondary actuating means rigidly connected to and substantially diametrically opposite said primary actuating means for engaging and shifting the member between the limit positions in accordance with the direction of rotation of the structure on which the primary and secondary means are carried.

3. Apparatus for damping oscillations of a first swiveling wheel structure rotatably mounted in a second relatively fixed bearing structure comprising a radially slotted member pivotally mounted on said bearing structure, primary actuating means carried by said wheel structure for pivoting said member with respect to the bearing structure when said primary means for retarding free pivotal movement of said member throughout a predetermined angle of operative range of said member defined by limit positions equally spaced on opposite sides of a center in-line position, means including walls defining cooperating, slidably engaged, arcuate surfaces on said member and on said swiveling wheel structure to releasably retain the member in either of its limit positions when rotated thereto by means of the rotation of said wheel structure in either direction from said in-line position, and secondary actuating means rigidly connected to and substantially diametrically opposite said primary actuating means for engaging and shifting the member between the limit positions in accordance with the direction of rotation of the structure on which the primary and secondary means are carried.

4. Apparatus for damping oscillations of a first swiveling wheel structure rotatably mounted in a second relatively fixed bearing structure comprising a radially slotted member pivotally mounted on said bearing structure, primary actuating means carried by said wheel structure for pivoting said member with respect to the bearing structure when said primary means engages the slot, means for retarding free pivotal movement of said member throughout a predetermined angle of operative range of said member defined by limit positions equally spaced on opposite sides of a center in-line position, means including walls defining cooperating, slidably engaged, arcuate surfaces on said member and on said swiveling wheel structure to releasably retain the member in either of its limit positions when rotated thereto by means of the rotation of said wheel structure in either direction from said in-line position, said primary actuating means and slotted member being so constructed and arranged to provide a high retarding force between the slotted member and the wheel structure in and adjacent the in-line position thereof and in positions of the slotted member progressively removed from said in-line position to provide a rapidly decreased retarding force as the slotted member approaches its limit positions, and secondary actuating means rigidly connected to and substantially diametrically opposite said primary actuating means for engaging and shifting the member between the limit positions in accordance with the direction of rotation of the structure on which the primary and secondary means are carried.

5. Apparatus for damping oscillations of a swiveling wheel structure comprising a spindle rotatably mounted in a supporting structure, a non-rotatable plate journaled on said spindle, a hydraulic dashpot mounted on said plate, said dashpot having a stationary member and a rotatable member, a slotted plate attached to the rotatable member of the dashpot, a short lever arm carried by the spindle and so constructed and arranged to engage the slotted plate upon rotation of the spindle, a long lever arm mounted on said spindle diametrically opposite the short lever arm, and means on said long lever arm for engaging the rotatable dashpot member to align the slot in the plate with the short lever arm when the spindle rotates through the half-turn position.

6. Apparatus for damping oscillations of a swiveling wheel structure comprising a spindle rotatably mounted in a supporting structure, a non-rotatable plate journaled on said spindle, means for retaining radial alignment of said plate and said supporting structure, a hydraulic dashpot mounted on said plate, said dashpot having a stationary member and a rotatable member, a slotted plate attached to the rotatable member of the dashpot, a short lever arm carried by the spindle, means on said short lever arm for engaging the slotted plate on the dashpot, a long lever arm mounted on said spindle, and means on said long lever arm for engaging said slotted plate at a point 180° from the point of engagement of the short lever arm whereby the means on the short lever arm may be aligned with the slot in the plate when the spindle makes a complete revolution.

7. Apparatus for damping oscillations of a swiveling wheel structure comprising a stem rotatably mounted in a supporting structure, a nonrotatable plate journaled on said stem, means for retaining radial alignment of said plate and said supporting structure, a hydraulic dashpot mounted on said plate, a stationary spindle for the dashpot, said spindle being keyed to the plate, a rotatable housing for the dashpot journaled on said spindle, a stationary vane slidably and radially mounted in said spindle within the dashpot housing, a slotted plate attached to the rotatable housing, a short lever arm carried by the stem, means on said short lever arm for engaging the slotted plate on the dashpot, a long lever arm mounted on said stem, and means on said long lever arm for engaging said plate at a point 180° from the point of engagement of the short lever arm whereby the means on the short lever arm may be aligned with the slot in the plate when the spindle makes a complete revolution.

8. In apparatus for damping oscillations of an aircraft landing wheel structure having a telescopic shock strut member comprising a relatively stationary housing and a rotatable telescoping piston, a short lever fixed to the piston and extending radially therefrom, a long lever fixed to said piston and extending radially therefrom at substantially 180° to said short lever, said levers being in spaced axial relation on said piston, a bracket rotatably mounted on said piston between said levers, a connecting link between said bracket and the housing, hydraulic damping means mounted on said bracket, said damping means having a rotatable member and a stationary member, the axis of rotation of the rotatable damping member being parallel to the axis of the piston, and means on the rotatable damping member for alternately engaging the short lever and the long lever upon rotation of the piston in the housing.

9. Apparatus in accordance with claim 8 in which the means on the rotatable damping member for engaging the long lever comprises a downwardly depending stud having a Y-shaped recess adapted to receive the engaging means on the long arm.

10. Apparatus in accordance with claim 8 in which the slotted plate is provided with a pair of arcuate faces and the short lever arm is provided with a recessed circular face adapted to engage arcuate faces on the slotted plate to retain the plate and dashpot against rotation when the short arm is disengaged with the slotted plate.

11. In apparatus for damping oscillations of an aircraft landing wheel structure having a telescopic shock strut member comprising a housing, a rotatable piston, a landing wheel supporting said piston, and a fork connecting the piston and the landing wheel, the combination of a short lever attached to the piston above the fork and extending radially therefrom, a long lever attached to the piston and extending radially therefrom at substantially 180° to said short lever, said levers being in spaced axial relation on said piston, a bracket journaled on said piston between said levers, a pair of links for aligning the housing and said bracket, one link being pivoted to the housing and the other link being pivoted to the bracket, a pivot pin connecting the opposite ends of the links to each other, hydraulic damping means mounted on said bracket, said damping means having a rotatable member and a stationary member, means on the rotatable damping member for engaging the short lever arm, and means diametrically positioned on the rotatable damping member for engaging the long lever when the piston rotates through the half-turn position in the housing.

ARTHUR E. BISHOP.

REFERENCES CITED

The following references are of record in the file of this patent:

UNITED STATES PATENTS

| Number | Name | Date |
| --- | --- | --- |
| 1,341,395 | Sutton | May 25, 1920 |
| 1,890,987 | Hansford | Dec. 13, 1932 |
| 2,367,993 | Bishop | Jan. 23, 1945 |

Certificate of Correction

Patent No. 2,572,589                                 October 23, 1951

ARTHUR E. BISHOP

It is hereby certified that error appears in the printed specification of the above numbered patent requiring correction as follows:

Column 5, line 40, after "primary" insert the words and comma *means engages the slot,*;

and that the said Letters Patent should be read as corrected above, so that the same may conform to the record of the case in the Patent Office.

Signed and sealed this 22nd day of January, A. D. 1952.

[SEAL]

THOMAS F. MURPHY,
*Assistant Commissioner of Patents.*